United States Patent
Montojo et al.

(10) Patent No.: US 8,675,573 B2
(45) Date of Patent: Mar. 18, 2014

(54) UPLINK RESOURCE MANAGEMENT IN A WIRELESS COMMUNICATION SYSTEM

(75) Inventors: Juan Montojo, San Diego, CA (US); Durga Prasad Malladi, San Diego, CA (US); Sandip Sarkar, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 1155 days.

(21) Appl. No.: 12/435,354

(22) Filed: May 4, 2009

(65) Prior Publication Data

US 2009/0274100 A1  Nov. 5, 2009

Related U.S. Application Data

(60) Provisional application No. 61/050,546, filed on May 5, 2008.

(51) Int. Cl.
*H04W 4/00* (2009.01)

(52) U.S. Cl.
USPC ........... 370/329; 370/338; 370/341; 370/348; 370/349

(58) Field of Classification Search
USPC .......... 370/329, 335, 342, 389, 428; 455/466, 455/422.1; 714/749
See application file for complete search history.

(56) References Cited

U.S. PATENT DOCUMENTS

| | | | |
|---|---|---|---|
| 2003/0123409 A1* | 7/2003 | Kwak et al. | 370/335 |
| 2003/0125051 A1* | 7/2003 | Leppisaari | 455/466 |
| 2004/0235447 A1 | 11/2004 | Gronberg et al. | |
| 2005/0265371 A1 | 12/2005 | Sharma et al. | |
| 2006/0034274 A1 | 2/2006 | Kakani et al. | |
| 2007/0186134 A1* | 8/2007 | Singh et al. | 714/749 |
| 2008/0225788 A1* | 9/2008 | Inoue et al. | 370/329 |
| 2008/0227443 A1* | 9/2008 | Whinnett | 455/422.1 |
| 2008/0259891 A1* | 10/2008 | Dent | 370/342 |

FOREIGN PATENT DOCUMENTS

| | | |
|---|---|---|
| CN | 1976272 A | 6/2007 |
| CN | 101010913 A | 8/2007 |
| EP | 1255368 A1 | 11/2002 |
| EP | 1641190 A1 | 3/2006 |
| EP | 1677456 A1 | 7/2006 |
| EP | 1755251 | 2/2007 |

OTHER PUBLICATIONS

Balachandran K. et al., "Efficient transmission of ARQ feedback for EGPRS radio link control" Vehicular Technology Conference, 1999. VTC 1999—Fall. IEEE VTS 50th Amsterdam, Netherlands Sep. 19-22, 1999, Piscataway, NJ.

(Continued)

*Primary Examiner* — Brian D Nguyen
*Assistant Examiner* — Toan Nguyen

(57) ABSTRACT

Management of uplink resources in a wireless communication is presented. In one embodiment, management of uplink resources comprises receiving a multi-bit acknowledge (multi-bit A/N) that is available for uplink transmission and receiving other information that is available for uplink transmission along with the multi-bit A/N. Next, it is determined whether a condition has been met. If the condition has been met, an uplink message is created comprising the multi-bit A/N but dropping the other information. If the condition has not been met, an uplink message is created which jointly codes the multi-bit A/N and the other information. The uplink message is then transmitted to a receiver.

16 Claims, 5 Drawing Sheets

(56) References Cited

OTHER PUBLICATIONS

USA,IEEE, US, vol. 3, Sep. 19, 1999, pp. 1663-1169, XP01035299.
International Search Report Written Opinion—PCT/US2009/042848, International Searching Authority—European Patent Office, Nov. 4, 2009.
IPWireless, Nextwave Wireless.,"TDD PUCCH",3GPP TSG-RAN WG1#50 R1-073283, pp. 1-9,Aug. 20, 2007.

Taiwan Search Report—TW098114841—TIPO—Aug. 20, 2012.
Texas Instruments: "Transmission of Downlink CQI in E-UTRA Uplink" 3GPP Draft; R1-072212-CQI, 3rd Generation Partnership Project (3GPP), Mobile Competence Centre; 650, Route des Lucioles; F-06921 Sophia-Antipolis Cedex; France, vol. RAN WG1, No. Kobe, Japan; May 7, 2007, May 1, 2007, XP050105948 section 2.

\* cited by examiner

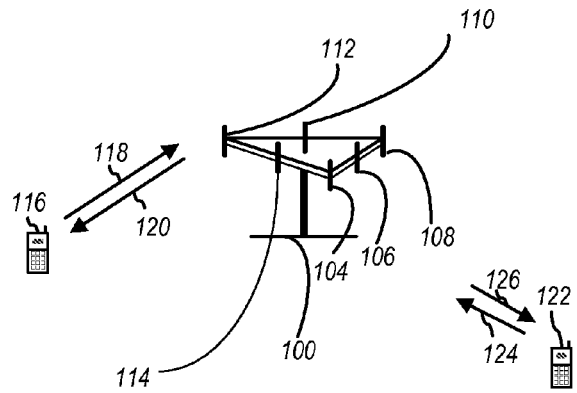
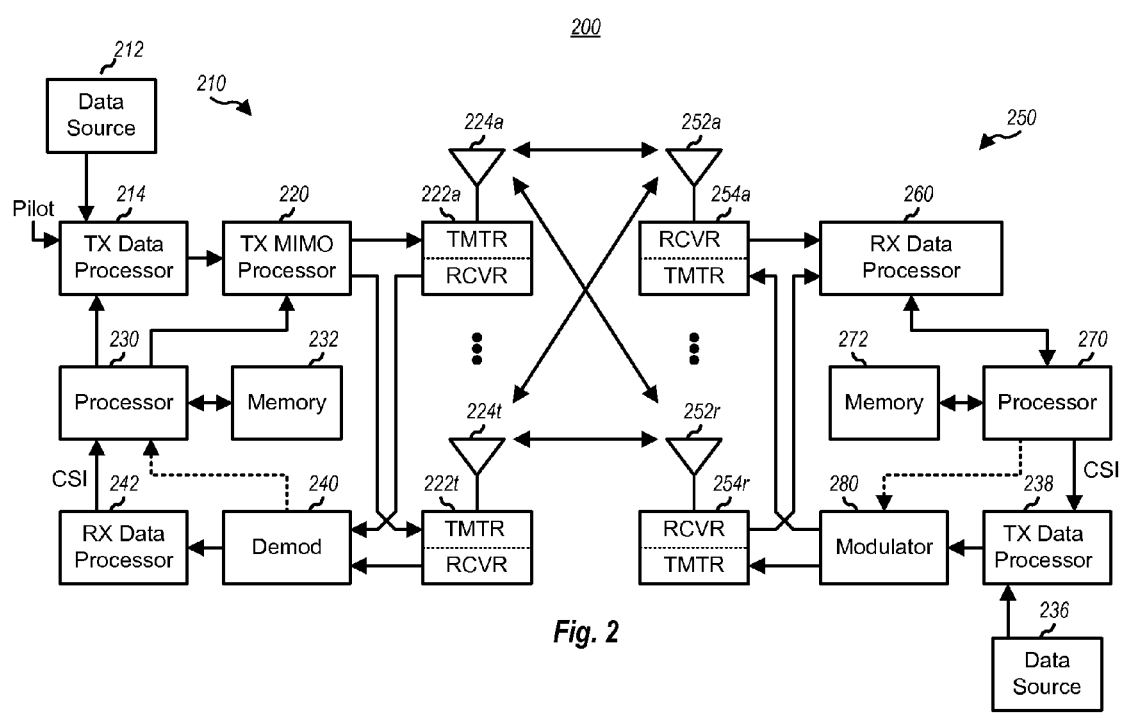
Fig. 1
Fig. 2

Figure 4. PUCCH Formats

| PUCCH format | Contents | Modulation scheme | Number of bits per subframe, $M_{bit}$ |
|---|---|---|---|
| 1 | Scheduling Request (SR) | N/A | N/A (information is carried by presence or absence of transmission) |
| 1a | ACK/NACK, ACK/NACK+SR | BPSK | 1 |
| 1b | ACK/NACK, ACK/NACK+SR | QPSK | 2 |
| 2 | CQI/PMI or RI (any CP), (CQI/PMI or RI)+ACK/NACK (ext. CP only) | QPSK | 20 |
| 2a | (CQI/PMI or RI)+ACK/NACK (normal CP only) | QPSK+BPSK | 21 |
| 2b | (CQI/PMI or RI)+ACK/NACK (normal CP only) | QPSK+QPSK | 22 |

UPLINK RESOURCE MANAGEMENT IN A WIRELESS COMMUNICATION SYSTEM

CROSS REFERENCE TO RELATED APPLICATIONS

This application claims priority to under 35 U.S.C. §119(e) from U.S. Provisional Patent Application No. 61/050,546, filed May 5, 2008, entitled "METHODS AND APPARATUSES FOR HANDLING MULTI-BIT ACKNOWLEDGE AND OTHER UPLINK PHYSICAL CHANNELS THAT ARE AVAILABLE FOR UPLINK TRANSMISSION IN A SAME SUB-FRAME" which is hereby incorporated by reference, as if set forth in full in this document, for all purposes.

BACKGROUND

Wireless communication systems are widely deployed to provide various types of communication content such as voice, data, and so on. These systems may comprise multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_s$ independent channels, which are also referred to as spatial channels, where $N_s \leq \min\{N_T, N_R\}$. Each of the Ns independent channels corresponds to a dimension. The MIMO system can provide improved performance (e.g., higher throughput and/or greater reliability) if the additional dimensionalities created by the multiple transmit and receive antennas are utilized.

A MIMO system supports a time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

Generally, wireless cellular communication networks incorporate a number of mobile UEs and a number of NodeBs. A NodeB is generally a fixed station, and may also be called a base transceiver system (BTS), an access point (AP), a base station (BS), or some other equivalent terminology. As improvements to networks are made, the NodeB functionality has evolved, so a NodeB is sometimes also referred to as an evolved NodeB (eNB). In general, NodeB hardware, when deployed, is fixed and stationary, while the UE hardware is portable.

In contrast to NodeB, the mobile UE can comprise portable hardware. User equipment (UE), also commonly referred to as a terminal or a mobile station, may be fixed or mobile device and may be a wireless device, a cellular phone, a personal digital assistant (PDA), a wireless modem card, and so on. Uplink communication (UL) refers to a communication from the mobile UE to the NodeB, whereas downlink (DL) refers to communication from the NodeB to the mobile UE. Each NodeB contains radio frequency transmitter(s) and the receiver(s) used to communicate directly with the mobiles, which move freely around it. Similarly, each mobile UE contains radio frequency transmitter(s) and the receiver(s) used to communicate directly with the NodeB. In cellular networks, the mobiles cannot communicate directly with each other but have to communicate with the NodeB.

Control information bits are transmitted, for example, in the uplink (UL), for several purposes. For instance, Downlink Hybrid Automatic Repeat ReQuest (HARQ) requires at least one bit of ACK/NACK transmitted in the uplink, indicating successful or failed circular redundancy check(s) (CRC). Moreover, a one bit scheduling request indicator (SRI) is transmitted in uplink, when a UE has new data arrival for transmission in uplink. Furthermore, an indicator of downlink channel quality (CQI) needs to be transmitted in the uplink to support mobile UE scheduling in the downlink. While CQI may be transmitted based on a periodic or triggered mechanism, the ACK/NACK generally needs to be transmitted in a timely manner to support the HARQ operation. Note that ACK/NACK is sometimes denoted as ACK/NAK, A/N, ACK, or any other equivalent term. As seen from this example, some elements of the control information should be provided additional protection, when compared with other information. For instance, the ACK/NACK information is typically required to be highly reliable in order to support an appropriate and accurate HARQ operation. This uplink control information is typically transmitted using the physical uplink control channel (PUCCH), as defined by the 3GPP working groups (WG), for evolved universal terrestrial radio access (EUTRA). The EUTRA is sometimes also referred to as 3GPP long-term evolution (3GPP LTE). The structure of the PUCCH is designed to provide sufficiently high transmission reliability.

In addition to PUCCH, the EUTRA standard also defines a physical uplink shared channel (PUSCH), intended for transmission of uplink user data. The Physical Uplink Shared Channel (PUSCH) can be dynamically scheduled. This means that time-frequency resources of PUSCH are re-allocated every sub-frame. This (re)allocation is communicated to the mobile UE using the Physical Downlink Control Channel (PDCCH). Alternatively, resources of the PUSCH can be allocated semi-statically, via the mechanism of persistent scheduling. Thus, any given time-frequency PUSCH resource can possibly be used by any mobile UE, depending on the scheduler allocation. Physical Uplink Control Channel (PUCCH) is different than the PUSCH, and the PUCCH is used for transmission of uplink control information (UCI). Frequency resources which are allocated for PUCCH are found at the two extreme edges of the uplink frequency spectrum. In contrast, frequency resources which are used for PUSCH are in between. Since PUSCH is designed for transmission of user data, re-transmissions are possible, and PUSCH is expected to be generally scheduled with less stand-alone sub-frame reliability than PUCCH. The general operations of the physical channels are described in the EUTRA specifications, for example: "3rd Generation Partnership Project; Technical Specification Group Radio Access Network; Evolved Universal Terrestrial Radio Access (E-UTRA); Physical Channels and Modulation (Release 8)."

A reference signal (RS) is a pre-defined signal, pre-known to both transmitter and receiver. The RS can generally be thought of as deterministic from the perspective of both transmitter and receiver. The RS is typically transmitted in order for the receiver to estimate the signal propagation medium. This process is also known as "channel estimation." Thus, an RS can be transmitted to facilitate channel estimation. Upon deriving channel estimates, these estimates are used for demodulation of transmitted information. This type of RS is sometimes referred to as De-Modulation RS or DM RS. Note that RS can also be transmitted for other purposes, such as channel sounding (SRS), synchronization, or any other purpose. Also note that Reference Signal (RS) can be sometimes called the pilot signal, or the training signal, or any other equivalent term.

In many modern communication systems, a UE is able to receive multiple downlink channels simultaneously. Each channel may require control information to be sent by the UE to the base station. As such, it is typical that multiple acknowledgements are needed for transmission in an uplink channel simultaneously. The multiple acknowledgements are generally grouped together to form a "multi-bit ACK/NAK" or "multi-bit A/N". Multi-bit A/N transmissions are typically used in communication systems where there is asymmetry in either link, as is the case in Time Division Duplex (TDD) systems. It is usually more of an issue when there are more DL Transmission Time Intervals (TTIs) than UL TTIs, as the power and code resources of the UE are more precious than those of the eNB. For example, a typical communication system may use four downlink processes and a single uplink process. The uplink transmission may then be followed by four downlink processes, etc. Generally, an acknowledgement for each of the four downlink processes is sent on the single uplink. However, during the sub-frame for the uplink transmission, other information, such as a channel quality indicator (CQI), a scheduling request (SR), a sounding reference signal (SRS), or other information, may be available for transmission on the same sub-frame. Generally, there is not enough room in sub-frame to include the multi-bit A/N and the other information. What is needed, therefore, is a way to efficiently transmit multi-bit A/N transmissions in addition to other data that may be available for transmission on the same sub-frame.

SUMMARY

Methods and apparatus are described herein to describe uplink resource management in a wireless communication system. More specifically, the ideas presented relate to the management of multi-bit A/N and other information when both are available for uplink transmission.

In one embodiment, uplink resource management comprises a method, the method comprising receiving a multi-bit acknowledge (multi-bit A/N) that is available for uplink transmission and receiving other information that is available for uplink transmission along with the multi-bit A/N. Next, a determination is made as to whether a condition has been met. If the condition is met, a message is constructed comprising the multi-bit A/N and the other information is dropped, or not transmitted. The message is then transmitted on an uplink channel to a receiver.

In another embodiment, uplink resource management comprises an apparatus, the apparatus comprising a processor configured for receiving a multi-bit acknowledge (multi-bit A/N) that is available for uplink transmission, for receiving other information that is available for uplink transmission along with the multi-bit A/N, for determining whether a condition has been met, and for constructing a message comprising the multi-bit acknowledge and dropping the other information if the condition has been met. The apparatus further comprises a transmitter coupled to the processor for transmitting the message to a receiver and a memory coupled to the processor for storing data relating to the operation of the processor.

In yet another embodiment, uplink resource management comprises an apparatus, the apparatus comprising means for receiving a multi-bit acknowledge (multi-bit A/N) that is available for uplink transmission, for receiving other information that is available for uplink transmission along with the multi-bit A/N, for determining whether a condition has been met, and for constructing a message that includes the multi-bit A/N and dropping the other information if the condition is met. The apparatus further comprises means for transmitting the message to a receiver.

In still another embodiment, uplink resource management comprises a machine-readable medium comprising instructions which, when executed by a machine, cause the machine to perform operations including receiving a multi-bit acknowledge (multi-bit A/N) that is available for uplink transmission, receiving other information that is available for uplink transmission along with the multi-bit A/N, determining whether a condition has been met, constructing a message comprising the multi-bit A/N and dropping the other information if the condition is met, and transmitting the message on an uplink channel to a receiver.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein:

FIG. 1 illustrates a multiple access wireless communication system according to one embodiment;

FIG. 2 is a block diagram of a communication system;

FIG. 4 is a table showing various PUCCH formats;

DESCRIPTION

Figure 3:
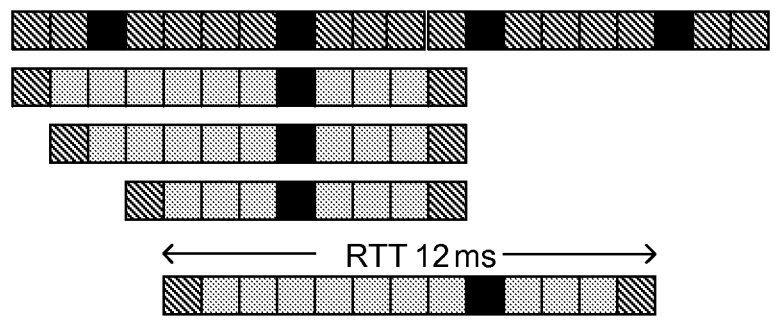
FIG. 3 illustrates an asymmetric partition of downlink and uplink processes.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). Cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). Cdma2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

Single carrier frequency division multiple access (SC-FDMA) uses single-carrier modulation and frequency domain equalization. SC-FDMA has similar performance and essentially the same overall complexity as those of OFDMA systems. SC-FDMA signals generally have lower peak-to-average power ratio (PAPR) because of its inherent single carrier structure. SC-FDMA has drawn great attention, especially in uplink communications where lower PAPR greatly benefits the mobile terminal in terms of transmit power efficiency. It is currently a working assumption for uplink multiple access schemes in 3GPP Long Term Evolution (LTE), or Evolved UTRA.

Referring to FIG. 1, a multiple access wireless communication system according to one embodiment is illustrated. An access point 100 (AP) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link, or downlink, 120 and receive information from access terminal 116 over reverse link, or uplink, 118. Access terminal 122 is in communication with antennas 106 and 108, where antennas 106 and 108 transmit information to access terminal 122 over forward link, or downlink, 126 and receive information from access terminal 122 over reverse link, or uplink, 124. In an FDD system, communication links 118, 120, 124 and 126 may use different frequencies for communication. For example, forward link 120 may use a different frequency then that used by reverse link 118.

Each group of antennas and/or the area in which they are designed to communicate is often referred to as a sector of the access point. Generally, antenna groups each are designed to communicate with access terminals in one sector of the total area covered by access point 100.

In communication over forward links 120 and 126, the transmitting antennas of access point 100 utilize beamforming in order to improve the signal-to-noise ratio of forward links for the different access terminals 116 and 124. In addition, beamforming causes less interference to access terminals in neighboring cells than an access point transmitting through a single antenna to all of its access terminals.

An access point may be a fixed station used for communicating with terminals (fixed or mobile) and may also be referred to as an access point, a Node B, or some other terminology. An access terminal may also be called an user equipment (UE), a wireless communication device, terminal, or some other similar terminology.

FIG. 2 is a block diagram of an embodiment of a transmitter system 210 (also known as the access point) and a receiver system 250 (also known as UE) in a MIMO communication system 200. At the transmitter system 210, traffic data for a number of data streams is provided from a data source 212 to a transmit (TX) data processor 214.

In an embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, de-interleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

In an aspect, logical channels are classified into Control Channels and Traffic Channels. Logical Control Channels comprise a Broadcast Control Channel (BCCH), a Paging Control Channel (PCCH), and a Multicast Control Channel (MCCH). The BCCH is a downlink channel used for broadcasting system control information. The PCCH is a downlink channel that transfers paging information, while the MCCH is Point-to-Multipoint downlink channel used for transmitting Multimedia Broadcast and Multicast Service (MBMS) scheduling and control information for one or several Multicast Traffic Channels (MTCHs). Generally, after establishing a Radio Resource Control (RRC) connection, this channel is only used by UEs that receive MBMS. A Dedicated Control Channel (DCCH) is defined as a point-to-point bi-directional channel that transmits dedicated control information, used by UEs having an RRC connection. In an aspect, Logical Traffic Channels comprise a Dedicated Traffic Channel (DTCH) which is point-to-point bi-directional channel dedicated to one UE for the transfer of user information. Also, a Multicast Traffic Channel (MTCH) is defined for transmitting point-to-multipoint traffic data in the downlink.

In an aspect, Transport Channels are classified into downlink (DL) and uplink (UL) channels. DL Transport Channels comprise a Broadcast Channel (BCH), a Downlink Shared Data Channel (DL-SDCH), and a Paging Channel (PCH). The PCH supports power saving in the UE (a DRX cycle is indicated by the network to the UE). It is generally broadcasted over an entire cell and mapped to PHY resources, which can be used for other control/traffic channels. The UL Transport Channels comprise a Random Access Channel (RACH), a Request Channel (REQCH), an Uplink Shared Data Channel (UL-SDCH), and a plurality of PHY channels. The PHY channels comprise a set of DL channels and UL channels.

The DL PHY channels comprise:
Common Pilot Channel (CPICH)
Synchronization Channel (SCH)
Common Control Channel (CCCH)
Shared DL Control Channel (SDCCH)
Multicast Control Channel (MCCH)
Shared UL Assignment Channel (SUACH)
Acknowledgement Channel (ACKCH)
DL Physical Shared Data Channel (DL-PSDCH)
UL Power Control Channel (UPCCH)
Paging Indicator Channel (PICH)
Load Indicator Channel (LICH)

The UL PHY Channels comprise:
Physical Random Access Channel (PRACH)
Channel Quality Indicator Channel (CQICH)
Acknowledgement Channel (ACKCH)
Antenna Subset Indicator Channel (ASICH)
Shared Request Channel (SREQCH)
UL Physical Shared Data Channel (UL-PSDCH)
Broadband Pilot Channel (BPICH)

In an aspect, a channel structure is provided that preserves low PAPR (at any given time, the channel is contiguous or uniformly spaced in frequency) properties of a single carrier waveform.

For the purposes of the present document, the following abbreviations apply:

| | |
|---|---|
| AM | Acknowledged Mode |
| AMD | Acknowledged Mode Data |
| ARQ | Automatic Repeat Request |
| BCCH | Broadcast Control Channel |
| BCH | Broadcast Channel |
| C- | Control- |
| CCCH | Common Control Channel |
| CCH | Control Channel |
| CCTrCH | Coded Composite Transport Channel |
| CP | Cyclic Prefix |
| CRC | Cyclic Redundancy Check |
| CTCH | Common Traffic Channel |
| DCCH | Dedicated Control Channel |
| DCH | Dedicated Channel |
| DL | DownLink |
| DSCH | Downlink Shared Channel |
| DTCH | Dedicated Traffic Channel |
| FACH | Forward link Access CHannel |
| FDD | Frequency Division Duplex |
| L1 | Layer 1 (physical layer) |
| L2 | Layer 2 (data link layer) |
| L3 | Layer 3 (network layer) |
| LI | Length Indicator |
| LSB | Least Significant Bit |
| MAC | Medium Access Control |
| MBMS | Multimedia Broadcast Multicast Service |
| MCCHMBMS | Point-to-multipoint Control Channel |
| MRW | Move Receiving Window |
| MSB | Most Significant Bit |
| MSCH MBMS | Point-to-multipoint Scheduling Channel |
| MTCH MBMS | Point-to-multipoint Traffic Channel |
| PCCH | Paging Control Channel |
| PCH | Paging Channel |
| PDU | Protocol Data Unit |
| PHY | Physical layer |
| PhyCH | Physical Channels |
| RACH | Random Access Channel |
| RLC | Radio Link Control |
| RRC | Radio Resource Control |
| SAP | Service Access Point |
| SDU | Service Data Unit |
| SHCCH | Shared Channel Control Channel |
| SN | Sequence Number |
| SUFI | Super Field |
| TCH | Traffic Channel |
| TDD | Time Division Duplex |
| TFI | Transport Format Indicator |
| TM | Transparent Mode |
| TMD | Transparent Mode Data |
| TTI | Transmission Time Interval |
| U- | User- |
| UE | User Equipment |
| UL | UpLink |
| UM | Unacknowledged Mode |
| UMD | Unacknowledged Mode Data |
| UMTS | Universal Mobile Telecommunications System |
| UTRA | UMTS Terrestrial Radio Access |
| UTRAN | UMTS Terrestrial Radio Access Network |
| MBSFN | Multicast Broadcast Single Frequency Network |
| MCE | MBMS Coordinating Entity |
| MCH | Multicast Channel |
| DL-SCH | Downlink Shared Channel |
| MSCH | MBMS control Channel |
| PDCCH | Physical Downlink Control Channel |
| PDSCH | Physical Downlink Shared Channel |
| MBSFN | Multicast Broadcast Single Frequency Network |
| MCE | MBMS Coordinating Entity |
| MCH | Multicast Channel |
| DL-SCH | Downlink Shared Channel |
| MSCH | MBMS Control Channel |
| PDCCH | Physical Downlink Control Channel |
| PDSCH | Physical Downlink Shared Channel |

The uplink (UL) in LTE communication systems is based on SC-FDMA (single carrier frequency division multiple access). The single carrier property is generally retained irrespective of the uplink (UL) transmissions. Multi-bit ACK and NAK transmissions are relevant for systems such as time division duplex (TDD) systems having more downlink (DL) processes than uplink (UL) processes.

FIG. 3 illustrates an asymmetric partition of downlink and uplink processes. There are four downlink HARQ processes (DL_1, DL_2, DL_3, and DL_4) and a single uplink process (UL_1). It should be understood that other variations of asymmetry are possible, for example, a 2-to-1, 3-to-1, 9-to-1, or more generally, an N-to-1 asymmetry between downlink processes and uplink processes.

Referring back to FIG. 3, after the four downlink processes have been transmitted by a base station and received by a UE, and an uplink transmission from the UE generally follows. Next, another four downlink processes are transmitted by the base station, followed by another uplink process, and so on. An acknowledgement (or negative acknowledgement) for each of the four downlink processes is generally sent by a UE on the uplink process (UL_1) channel. These acknowledgements are grouped together to form a multi-bit acknowledgement/negative acknowledgement (multi-bit A/N). However, other information, such as a channel quality indicator (CQI), a scheduling request (SR), a sounding reference signal (SRS), or other information, may also be available for transmission along with the multi-bit A/N.

In general, the nature of the asymmetry between downlink processes and uplink processes necessitates the transmission of information (e.g., ACK/NACK, CQI, scheduling request, sounding reference signal, and others) at approximately the same time. Typically, each of these types of information is transmitted in one sub-frame of an uplink message.

A Physical Uplink Control Channel (PUCCH) is defined in LTE systems for providing control information from a UE to a base station. The PUCCH has several formats, as shown in FIG. 4. PUCCH format 1 is used for SR transmission. PUCCH format 1A is used for ACK transmission (SIMO: 1 bit). PUCCH format 1B is used for ACK transmission (MIMO: 2 bits). PUCCH format 2 is used for CQI transmission. According to one embodiment, when CQI and A/N are transmitted in the same sub-frame the following technique is employed.

Hybrid Automatic Repeat Request (HARQ) has become the de facto MAC layer retransmission scheme in modern cellular networks, and can be credited with significantly improving the probability of successful transmissions in those networks. HARQ differs from conventional retransmission schemes in that it combines signals from previous failed transmissions with that of a new retransmission to improve the odds of its successful decoding. HARQ-ACK feedback is one method of providing acknowledgement information for more than one downlink (DL) process and is transmitted in one uplink message, such as in a message sub-frame.

Figure 5:
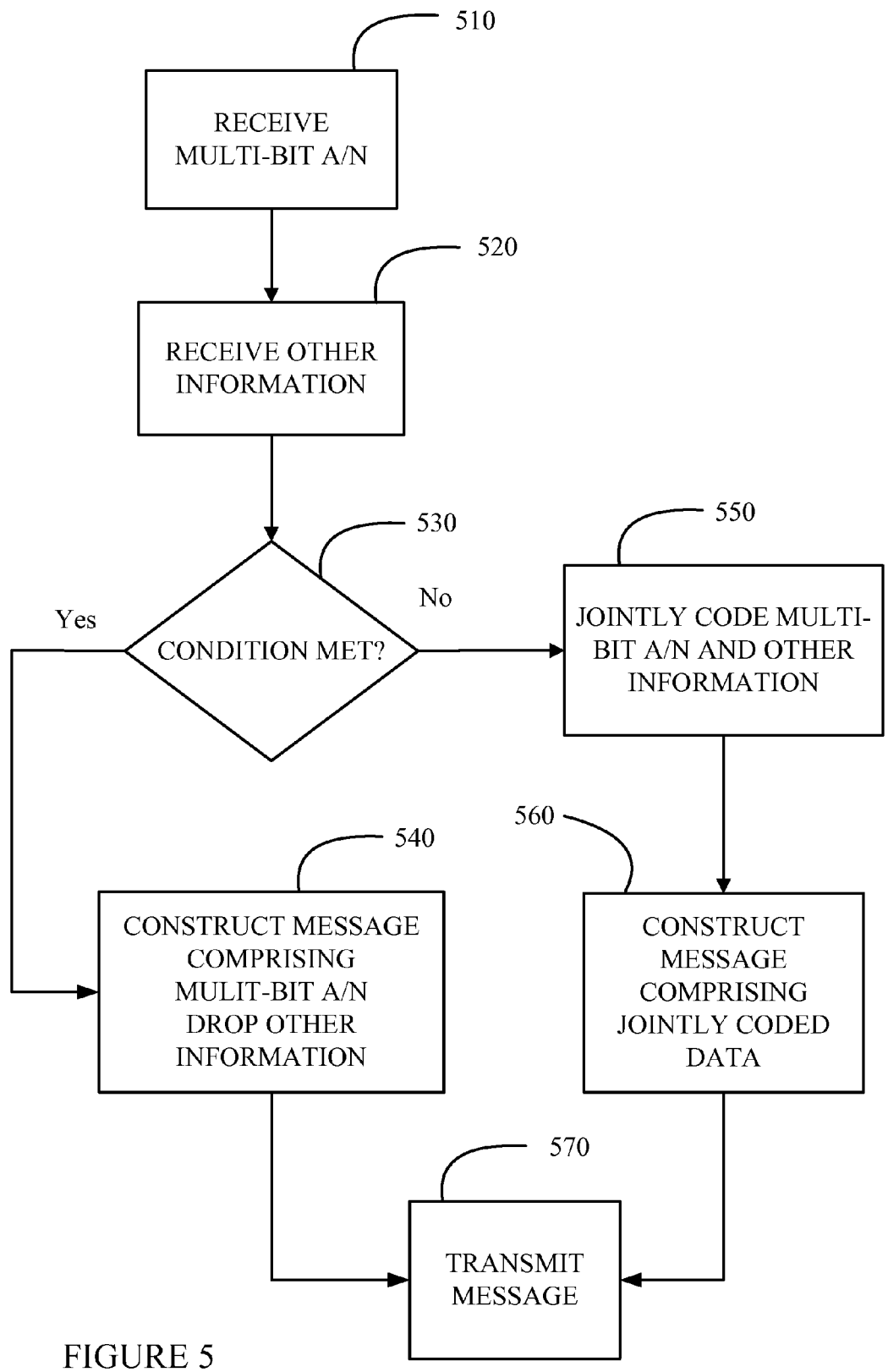
FIG. 5 is a flow diagram which illustrates how multi-bit acknowledgements and other information available for transmission are handled.

FIG. 5 is a flow diagram illustrating a method for processing multi-bit A/N and other information when both are available for uplink transmission. In step 510, a multi-bit A/N is available for uplink transmission and received, generally, by a processor, such as processor 238 and/or 270 in FIG. 2. In step 520, other information is also available for uplink transmission along with the multi-bit A/N and is received by the processor(s). In step 530, a determination is made as to whether a condition has been met or not. In one embodiment, the condition is a size of the multi-bit A/N and if it has exceeded a predetermined threshold. If the condition is met, an uplink message is constructed in step 540, comprising the multi-bit A/N. However, all or a portion of the other information is dropped, i.e., not transmitted. Processors 238 and/or 270 generally perform this step. In one embodiment, the number of bits contained in the multi-bit A/N is used as a basis to choose the predetermined threshold. For example, if the size of a particular multi-bit A/N is 8, a value such as 5 may be chosen as the predetermined value. The value chosen will depend on a number of system constraints, such as system capacity, amount of other information to be transmitted and a rate at which the other information is received. In another embodiment, the predetermined threshold is based on a number of bits after the multi-bit A/N has been encoded. For example, if an RM(20,N) code is used (i.e., 20 bits output from the encoder), the predetermined threshold may be based on the number of bits at the output of the decoder. In this example, perhaps 12 or 13 would be selected as the predetermined threshold. In yet another embodiment, the other information could be used in conjunction with the size of the multi-bit A/N to determine whether or not to drop the other information from transmission. In this embodiment, the sum of the number of bits of the multi-bit A/R and the number of bits of the other information is used to determine whether to drop the other information from transmission. If the sum of the bits are greater than a predetermined threshold, the other information is dropped. In another embodiment, the sum of the number of bits after individually coding the multi-bit A/N and other information is compared to a threshold to determine whether or not to drop the other information from transmission. If the sum is greater than the predetermined threshold, some or all of the other information is dropped. If the sum is less than the predetermined threshold, the multi-bit A/N is jointly coded with the other information.

Referring back to FIG. 5, step 550 is performed if the condition is not met, where the multi-bit A/N and the other information are joint coded, again generally using processors 238 and/or 270. An uplink message is then constructed using the jointly coded information in step 560 (generally using processors 238 and/or 270). In either case (condition met or not) the uplink message is transmitted to a base station in step 570 using modulator 280 and transmitter 254r.

In one embodiment, when multi-bit A/N and SR are both available for uplink transmission, a condition is evaluated to determine whether to drop the SR and to transmit only the multi-bit A/N, or whether to joint code the multi-bit A/N and SR. In one embodiment, the condition is whether the size of the multi-bit A/N exceeds a given threshold. The size may be expressed as a number of bits, an amount of time, or an expression of an amount of resources needed to transmit the information. If the size of the multi-bit A/N is greater than the predetermined threshold, a processor in the UE, such as processor 238 and/or processor 270, constructs an uplink message comprising the multi-bit A/N transmission to a base station, and the SR information is dropped, or not transmitted. In one embodiment, the processor uses PUCCH format 2 to convey the multi-bit A/N. The dropped SR may be transmitted in a subsequent transmission, or it may be discarded altogether. In one embodiment, the uplink message comprises one or more data frames which are, in turn, divided into sub-frames. In this embodiment, the multi-bit A/N is inserted into one of the sub-frames for transmission. The uplink message is then provided to one or more electronic components, such as modulator 280 and transmitter 254r, as shown in FIG. 2.

If the condition is not met, for example if the size of the multi-bit A/N is less than the predetermined threshold, the information is joint coded in one of several possible ways. In one embodiment, the SR modulates the DM-RS (2 DM-RS symbols/slot) if normal cyclic prefix (CP) is used. If SR=DTX (i.e., no scheduling request), then there is no modulation of DM-RS, and a regular transmission of PUCCH format 2 occurs. When SR=1 (i.e., there is a scheduling request), there is a modulation (rotation) of one DM-RS in each slot. In another embodiment, in the case of using extended CP, SR and multi-bit A/N are jointly coded (1 DM-RS symbol/slot). Blind decoding is utilized at the base station (eNB) receiver to differentiate Multi-bit A/N and Multi-bit A/N with SR in this case.

In another embodiment, when multi-bit A/N and CQI are both available for uplink transmission, a condition is evaluated to determine whether to drop the CQI and to transmit only the multi-bit A/N, or whether to joint code the multi-bit A/N and CQI. In one embodiment, the condition is whether the size of the multi-bit A/N exceeds a given threshold. The size may be expressed as a number of bits, an amount of time, or an expression of an amount of resources needed to transmit the information. If the size of the multi-bit A/N is greater than the predetermined threshold, a processor in the UE, such as processor 238 and/or processor 270, constructs an uplink message comprising the multi-bit A/N transmission to a base station, and the CQI information is dropped, or not transmitted. In one embodiment, the processor uses PUCCH format 2 to convey the multi-bit A/N. The dropped CQI may be transmitted in a subsequent transmission, or it may be discarded altogether. In one embodiment, the uplink message comprises one or more data frames which are, in turn, divided into sub-frames. In this embodiment, the multi-bit A/N is inserted into one of the sub-frames for transmission. The uplink message is then provided to one or more electronic components, such as modulator 280 and transmitter 254r, as shown in FIG. 2.

If the condition is not met, for example if the size of the multi-bit A/N is less than the predetermined threshold, the information is joint coded in one of several possible ways. In one embodiment, for normal cyclic prefix (CP), the ACK/NACK (A/N) modulates one DM-RS (Demodulation Reference Signal) symbol in each slot of a sub-frame. For extended CP, the A/N and CQI are jointly coded. In both cases, CQI and A/N are transmitted in PHY resources for CQI (PUCCH format 2). Blind decoding is utilized at the base station (eNB) receiver to differentiate Multi-bit A/N and Multi-bit A/N with CQI in this case.

In yet another embodiment, when a multi-bit A/N and SRS are both available for uplink transmission in the same sub-frame, a condition is evaluated to determine whether to drop the SRS and to transmit only the multi-bit A/N, or whether to joint code the multi-bit A/N and SRS. In one embodiment, the condition is whether the size of the multi-bit A/N exceeds a given threshold. The size may be expressed as a number of bits, an amount of time, or any other way to express an amount of resources needed to transmit the information. If the size of the multi-bit A/N is greater than the predetermined threshold, a processor in the UE, such as processor 214 and/or processor 230, inserts the multi-bit A/N into a sub-frame for uplink transmission to a nodeB and the SRS information is dropped, or not used, in that sub-frame. In one embodiment, the processor uses the PUCCH format 2 to convey the multi-bit A/N. The dropped SRS information may be transmitted in a subsequent transmission, or it may be discarded altogether.

If the condition is not met, for example if the size of multi-bit A/N is less than a predetermined threshold, transmission of SRS (last SC-FDMA symbol in sub-frame) using SRS PHY resources and multi-bit A/N (using all other symbols). PHY resources are used for multi-bit A/N, and a PUCCH format 2 with last symbol truncated may be employed. It is noted that no new PUCCH format is needed for the transmission of multi-bit A/N.

TABLE I illustrates various potential combinations of multi-bit A/N and other information and associated actions taken for each combination. For example, if both multi-bit A/N and SR are both available for transmission, the method described above in paragraphs are used to determine how to construct a message for transmission to the nodeB. Similarly, if both multi-bit A/N and CQI are both available for transmission, the method described above in paragraphs are used to determine how to construct the message. Finally, if both multi-bit A/N and SRS are both available for transmission, the method described above in paragraphs are used to determine how to construct the message. If more than two types of information is available for transmission along with the multi-bit A/N (for example, the combination of SR, SRS, and the multi-bit A/N in Table I), the action taken may involve transmitting one of the types of other information and, in addition, using one of the methods described above in either paragraphs. It should be understood that the notations A/N-SR, A/N-CQI, and A/N-SRS used in Table I refer to the methods described above, respectively.

TABLE I

| SRS | CQI | SR | A/N | Action Taken |
|-----|-----|----|----|--------------|
|     |     |    | X  | Multi-bit A/N transmitted normally |
|     |     | X  |    | SR transmitted normally |
|     |     | X  | X  | A/N-SR |
|     | X   |    | X  | A/N-CQI |
|     | X   | X  | X  | SR transmitted, plus A/N according to AN-SR, QCI not transmitted |
| X   |     |    |    | SRS transmitted normally |
| X   |     |    | X  | A/N-SRS |
| X   |     | X  |    | SRS not transmitted |
| X   |     | X  | X  | SR transmitted, plus A/N according to AN-SR. SRS either transmitted or not transmitted (dropped) |
| X   | X   |    | X  | CQI plus A/N according to AN-CQI. SRS either transmitted or not transmitted (dropped) |
| X   | X   | X  | X  | SR + A/N according to AN-SR, CQI not transmitted, SRS either transmitted or not transmitted (dropped) |

Figure 6:
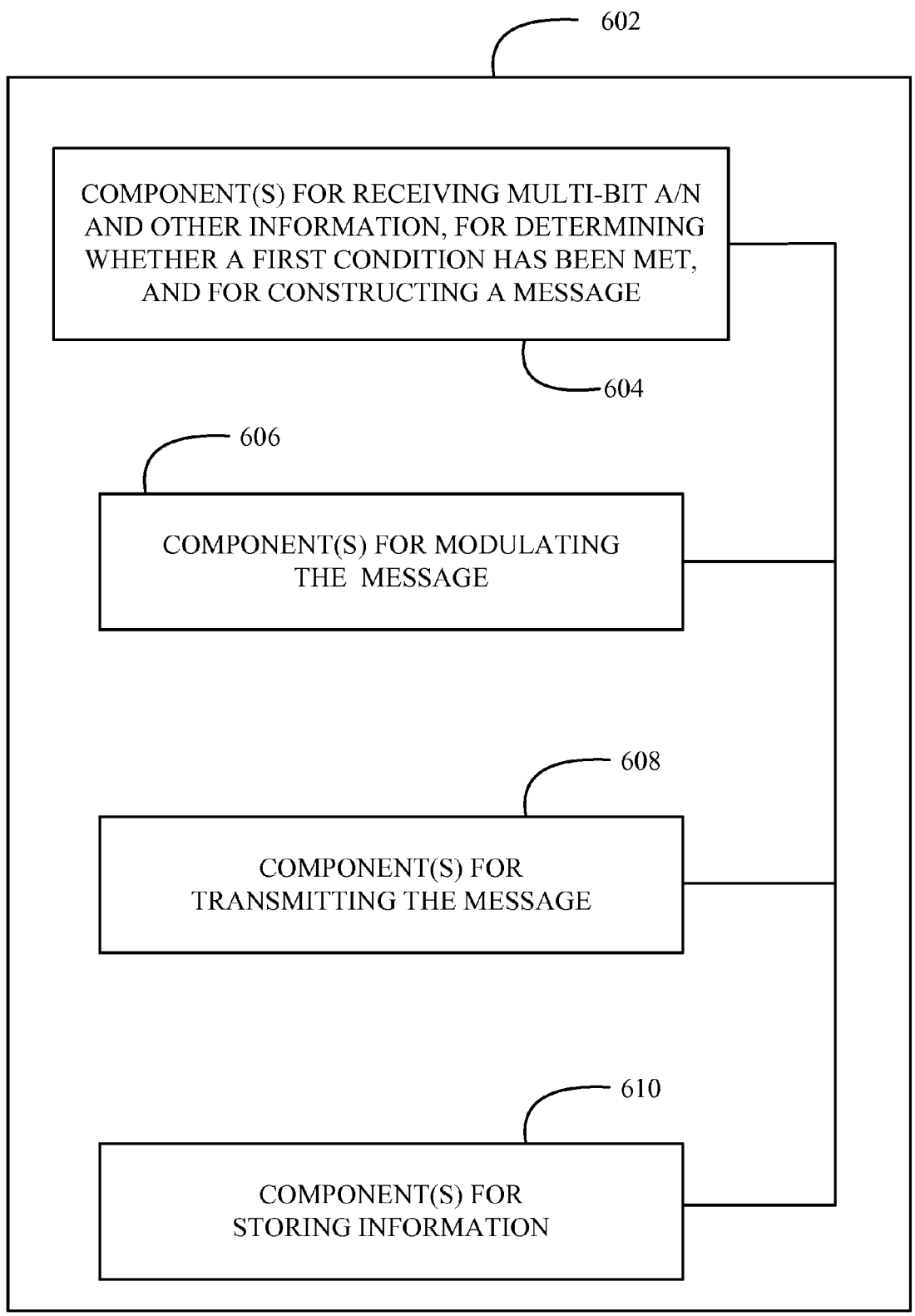
FIG. 6 illustrates one embodiment of an apparatus for managing uplink resources in a mobile device.

FIG. 6 illustrates one embodiment of an apparatus for managing uplink resources in a mobile device. Apparatus 600 generally resides within user equipment (UE). It is to be appreciated that apparatus 600 is represented as including functional blocks, which can be functional blocks that represent functions implemented by a computing platform, processor, software, or combination thereof (e.g., firmware). It should also be understood that not all of the functional blocks shown in FIG. 6 may be necessary for implementing various aspects of the various embodiments discussed herein.

Apparatus 600 includes a logical grouping 602 of electronic components that can act in conjunction. For instance, logical grouping 602 can include one or more electronic components 604 for receiving a multi-bit acknowledge (multi-bit A/N) that is available for uplink transmission. The electronic component(s) 604 is additionally used to receive other information that is available for uplink transmission along with the multi-bit A/N, such as a channel quality indicator (CQI), a scheduling request (SR), a sounding reference signal (SRS), or other information. Electronic component(s) 604 is additionally used to determining whether a condition has been met. In one embodiment, the condition comprises whether or not the size of the multi-bit A/N exceeds a predetermined threshold. Electronic component(s) 604 then constructs a message which includes the multi-bit A/N and drops the other information if the condition is met and provides the message to electronic component(s) 606. If the condition is not met, electronic component(s) 604 jointly codes the multi-bit A/N and the other information. In either case, electronic component(s) 604 constructs a message comprising either the multi-bit A/N or the jointly coded multi-bit A/N and other information, and provides the message to electronic component(s) 606 for modulation and electronic component(s) 608 for transmission over-the-air to a base station. Apparatus 600 typically includes electronic component(s) 610 for storing information and instructions for executing functions associated with electronic components 604-608.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blue-ray disc where disks usually reproduce data magnetically, while discs reproduce data optically with lasers. Combinations of the above should also be included within the scope of computer-readable media.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope. consistent with the principles and novel features disclosed herein.

What is claimed is:

1. A method used in wireless communication system, the method comprising:
    receiving a multi-bit acknowledge (multi-bit A/N) that is available for uplink transmission;
    receiving other information that is available for uplink transmission along with the multi-bit A/N;
    determining whether a condition has been met;
    constructing a message comprising the multi-bit A/N and dropping the other information if the condition is met, wherein the condition is defined as a size of the multi-bit A/N plus the size of the other information and the condition is met when the size of the multi-bit A/N plus the size of the other information is greater than a predetermined threshold; and
    transmitting the message on an uplink channel to a receiver.

2. The method of claim 1, further comprising:
    joint coding the multi-bit A/N and the other information if the condition is not met; and constructing the message comprising the jointly coded multi-bit A/N and the other information if the condition is not met.

3. A method used in wireless communication system, the method comprising:
receiving a multi-bit acknowledge (multi-bit A/N) that is available for uplink transmission;
receiving other information that is available for uplink transmission along with the multi-bit A/N;
determining whether a condition has been met;
constructing a message comprising the multi-bit A/N and dropping the other information if the condition is met, wherein the condition is defined as a size of the multi-bit A/N after coding plus the size of the other information after coding and the condition is met when the size of the multi-bit A/N after coding plus the size of the other information after coding is greater than a predetermined threshold; and
transmitting the message on an uplink channel to a receiver.

4. The method of claim 3, further comprising:
joint coding the multi-bit A/N and the other information if the condition is not met; and
constructing the message comprising the jointly coded multi-bit A/N and the other information if the condition is not met.

5. A non-transitory machine-readable medium comprising instructions which, when executed by a machine, cause the machine to:
receive a multi-bit acknowledge (multi-bit A/N) that is available for uplink transmission;
receive other information that is available for uplink transmission along with the multi-bit A/N;
determine whether a condition has been met;
construct a message comprising the multi-bit A/N and dropping the other information if the condition is met, wherein the condition is defined as a size of the multi-bit A/N plus the size of the other information and the condition is met when the size of the multi-bit A/N plus the size of the other information is greater than a predetermined threshold; and
transmit the message on an uplink channel to a receiver.

6. The machine-readable medium of claim 5, further comprising instructions for causing the machine to:
joint code the multi-bit A/N and the other information if the condition is not met; and
construct the message comprising the jointly coded multi-bit A/N and the other information if the condition is not met.

7. A non-transitory machine-readable medium comprising instructions which, when executed by a machine, cause the machine to:
receive a multi-bit acknowledge (multi-bit A/N) that is available for uplink transmission;
receive other information that is available for uplink transmission along with the multi-bit A/N;
determine whether a condition has been met;
construct a message comprising the multi-bit A/N and dropping the other information if the condition is met, wherein the condition is defined as a size of the multi-bit A/N after coding plus the size of the other information after coding and the condition is met when the size of the multi-bit A/N after coding plus the size of the other information after coding is greater than a predetermined threshold; and
transmit the message on an uplink channel to a receiver.

8. The machine-readable medium of claim 7, further comprising instructions for causing the machine to:
joint code the multi-bit A/N and the other information if the condition is not met; and
construct the message comprising the jointly coded multi-bit A/N and the other information if the condition is not met.

9. An apparatus operable in a wireless communication system, the apparatus comprising:
a processor, configured to: receive a multi-bit acknowledge (multi-bit A/N) that is available for uplink transmission, receive other information that is available for uplink transmission along with the multi-bit A/N, determine whether a condition has been met, construct a message comprising the multi-bit acknowledge and drop the other information if the condition is met, wherein the condition is defined as a size of the multi-bit A/N plus the size of the other information and the condition is met when the size of the multi-bit A/N plus the size of the other information is greater than a predetermined threshold;
a transmitter coupled to the processor for transmitting the message to a receiver; and
a memory coupled to the processor for storing data relating to the operation of the processor.

10. The apparatus of claim 9, wherein the processor is further configured to:
joint code the multi-bit A/N and the other information if the condition is not met; and
construct the message comprising the jointly coded multi-bit A/N and the other information if the condition is not met.

11. An apparatus operable in a wireless communication system, the apparatus comprising:
a processor, configured to: receive a multi-bit acknowledge (multi-bit A/N) that is available for uplink transmission, receive other information that is available for uplink transmission along with the multi-bit A/N, determine whether a condition has been met, for constructing a message comprising the multi-bit acknowledge and drop the other information if the condition is met, wherein the condition is defined as a size of the multi-bit A/N after coding plus the size of the other information after coding and the condition is met when the size of the multi-bit A/N after coding plus the size of the other information after coding is greater than a predetermined threshold;
a transmitter coupled to the processor for transmitting the message to a receiver; and
a memory coupled to the processor for storing data relating to the operation of the processor.

12. The apparatus of claim 11, wherein the processor is further configured to:
joint code the multi-bit A/N and the other information if the condition is not met; and
construct the message comprising the jointly coded multi-bit A/N and the other information if the condition is not met.

13. An apparatus operable in a wireless communication system, the apparatus comprising:
means for receiving a multi-bit acknowledge (multi-bit A/N) that is available for uplink transmission, for receiving other information that is available for uplink transmission along with the multi-bit A/N, for determining whether a condition has been met, and for constructing a message that includes the multi-bit A/N and dropping the other information if the condition is met, wherein the condition is defined as a size of the multi-bit A/N plus the size of the other information and the condition is met when the size of the multi-bit A/N plus the size of the other information is greater than a predetermined threshold.

14. The apparatus of claim 13, further comprising:

means for joint coding the multi-bit A/N and the other information if the condition is not met; and means for constructing the message comprising the jointly coded multi-bit A/N and the other information if the condition is not met.

15. An apparatus operable in a wireless communication system, the apparatus comprising:

means for receiving a multi-bit acknowledge (multi-bit A/N) that is available for uplink transmission, for receiving other information that is available for uplink transmission along with the multi-bit A/N, for determining whether a condition has been met, and for constructing a message that includes the multi-bit A/N and dropping the other information if the condition is met, wherein the condition is defined as a size of the multi-bit A/N after coding plus the size of the other information after coding and the condition is met when the size of the multi-bit A/N after coding plus the size of the other information after coding is greater than a predetermined threshold.

16. The apparatus of claim 15, further comprising:

means for joint coding the multi-bit A/N and the other information if the condition is not met; and means for constructing the message comprising the jointly coded multi-bit A/N and the other information if the condition is not met.

\* \* \* \* \*